(12) United States Patent
Wang et al.

(10) Patent No.: US 11,831,036 B2
(45) Date of Patent: Nov. 28, 2023

(54) BATTERY PACK AND APPARATUS USING BATTERY PACK AS POWER SUPPLY

(71) Applicant: Contemporary Amperex Technology Co., Limited, Ningde (CN)

(72) Inventors: Yongguang Wang, Ningde (CN); Yu Tang, Ningde (CN); Xingdi Chen, Ningde (CN); Peng Wang, Ningde (CN); Jinqing Ji, Ningde (CN); Mu Qian, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 18/087,404

(22) Filed: Dec. 22, 2022

(65) Prior Publication Data

US 2023/0134692 A1    May 4, 2023

Related U.S. Application Data

(63) Continuation of application No. PCT/CN2021/082424, filed on Mar. 23, 2021.

(30) Foreign Application Priority Data

Jun. 23, 2020   (CN) .......................... 202010580242

(51) Int. Cl.
*H01M 50/242* (2021.01)
*H01M 50/264* (2021.01)
(Continued)

(52) U.S. Cl.
CPC ......... *H01M 50/242* (2021.01); *H01M 10/52* (2013.01); *H01M 50/222* (2021.01); *H01M 50/264* (2021.01)

(58) Field of Classification Search
CPC ... H01M 50/242; H01M 50/264; H01M 10/52
See application file for complete search history.

(56) References Cited

U.S. PATENT DOCUMENTS

2018/0130992 A1    5/2018 Xu et al.
2019/0245175 A1*   8/2019 Qin ....................... H01M 50/24
(Continued)

FOREIGN PATENT DOCUMENTS

CN    207409556 U    5/2018
CN    207896195 U    9/2018
(Continued)

OTHER PUBLICATIONS

Supplementary European Search Report for European Patent No. 21827814, dated Oct. 28, 2022, 9 pages.
(Continued)

*Primary Examiner* — Jonathan G Jelsma
(74) *Attorney, Agent, or Firm* — Sterne, Kessler, Goldstein & Fox P.L.L.C.

(57) ABSTRACT

The present disclosure relates to a battery pack and an apparatus using the battery pack as a power supply, and relates to the technical field of batteries, to optimize performance of the battery pack. The battery pack includes a box body, a battery module, a module electrical connection piece, and a first protecting assembly. The battery module is mounted in the box body, and the battery module includes an anti-explosion assembly. The module electrical connection piece is mounted on the battery module. The first protecting assembly is mounted in the box body and is configured to protect the module electrical connection piece when an ejecta discharged from the anti-explosion assembly impacts the module electrical connection piece. The above technical scheme reduces probability of secondary short circuit of the battery pack.

9 Claims, 10 Drawing Sheets

(51) Int. Cl.
H01M 10/52 (2006.01)
H01M 50/222 (2021.01)

(56) References Cited

U.S. PATENT DOCUMENTS

| | | |
|---|---|---|
| 2019/0288256 A1 | 9/2019 | Qin et al. |
| 2020/0212396 A1 | 7/2020 | Chen et al. |
| 2020/0350536 A1 | 11/2020 | Hu et al. |
| 2021/0028426 A1 | 1/2021 | Tang et al. |
| 2021/0159575 A1 | 5/2021 | Hu et al. |
| 2021/0175572 A1 | 6/2021 | He et al. |

FOREIGN PATENT DOCUMENTS

| | | |
|---|---|---|
| CN | 10165117 A | 8/2019 |
| CN | 209249548 U | 8/2019 |
| CN | 110277533 A | 9/2019 |
| CN | 209730085 U | 12/2019 |
| CN | 209730091 U | 12/2019 |
| CN | 110767855 A | 2/2020 |
| CN | 210092179 U | 2/2020 |
| CN | 112332032 A | 2/2021 |
| EP | 3054500 A1 | 8/2016 |

OTHER PUBLICATIONS

Chinese Office Action directed to Chinese Patent Application No. 202010580242, dated Jun. 6, 2022; 10 pages.
International Search Report for International Application No. PCT/CN2021/082424, Chinese Patent Office, dated Jun. 23, 2021, 4 pages.

* cited by examiner

B-B

BATTERY PACK AND APPARATUS USING BATTERY PACK AS POWER SUPPLY

CROSS-REFERENCE TO RELATED APPLICATIONS

This application is a continuation of International Application No. PCT/CN2021/082424, filed on Mar. 23, 2021, which claims priority to Chinese Patent Application No. 202010580242.8, filed on Jun. 23, 2020, both of which are incorporated herein by reference in their entireties.

FIELD OF THE INVENTION

The present disclosure relates to the technical field of batteries, and more particularly, to a battery pack and an apparatus using the battery pack as a power supply.

BACKGROUND

As an important component of an electric automobile, a battery pack is used for providing power to the electric automobile. The battery pack includes at least one battery module; the battery module includes at least one battery cell; and the battery cell is provided with an anti-explosion assembly. When thermorunaway takes place on a single battery cell, the anti-explosion assembly will be started, and a short circuit is prone to occur on the whole battery module, which poses a safety risk. Therefore, a need exists to solve this problem.

SUMMARY OF THE INVENTION

The present disclosure provides a battery pack and an apparatus using the battery pack as a power supply to improve a structure of the battery pack.

Some embodiments of the present disclosure provide a battery pack, including:

a box body;

a battery module mounted in the box body, the battery module comprising an anti-explosion assembly;

a module electrical connection piece mounted on the battery module; and a first protecting assembly mounted in the box body and configured to protect the module electrical connection piece when an ejecta discharged from the anti-explosion assembly impacts the module electrical connection piece.

In some embodiments, the first protecting assembly comprises protection sheet wrapped around the module electrical connection piece.

In some embodiments, the first protecting assembly comprises a shell, and the module electrical connection piece is positioned in the shell.

In some embodiments, the first protecting assembly comprises:

a first insulating member mounted on a side wall and/or a bottom wall of the box body corresponding to a position of the module electrical connection piece, wherein the first insulating member is configured to isolate the box body from the module electrical connection piece.

In some embodiments, the battery pack further includes:

a second protecting assembly mounted in the box body and facing toward the anti-explosion assembly, wherein the second protecting assembly is configured to protect the box body from an impact by the ejecta discharged from the anti-explosion assembly.

In some embodiments, the second protecting assembly bends toward the anti-explosion assembly along edges of two sides in a direction of a connecting line between the anti-explosion assembly and the module electrical connection piece, to enclose the anti-explosion assembly in a space formed by the second protecting assembly and the battery module.

In some embodiments, the battery pack further includes:

a beam provided with a notch, wherein the module electrical connection piece penetrates through the notch and is configured to electrically connect an external electric appliance;

The first protecting assembly further comprises a second insulating member mounted on the notch, and the second insulating member is configured to isolate the module electrical connection piece from the beam.

In some embodiments, the battery pack further includes:

a pressing plate fixedly connected with the beam and configured to fix the battery module.

In some embodiments, a material of the first protecting assembly is mica.

Some embodiments of the present disclosure provide an apparatus using a battery pack as a power supply, comprising the battery pack provided by any technical scheme of the present disclosure.

A module electrical connection piece in the battery pack provided in the technical scheme is provided with a first protecting assembly, and the first protecting assembly protects the module electrical connection piece when an ejecta discharged from the anti-explosion assembly impacts the module electrical connection piece. Further, the first protecting assembly effectively reduce protecting failure of the module electrical connection piece caused by the injection discharged from the anti-explosion assembly, such that probability of electric connection between the module electrical connection piece and a box body is further reduced. Finally, the probability of secondary short circuit of the battery pack is reduced.

BRIEF DESCRIPTION OF THE DRAWINGS

FIG. 4b is a schematic front view of FIG. 4a;

FIG. 5b is a schematic B-B section view of FIG. 5a;

FIG. 6b is a partially enlarged schematic view of Area D in FIG. 6a;

DESCRIPTION OF THE INVENTION

The technical scheme provided by the present disclosure will be described in more detail below with reference to FIGS. 1 to 12.

Figure 3:
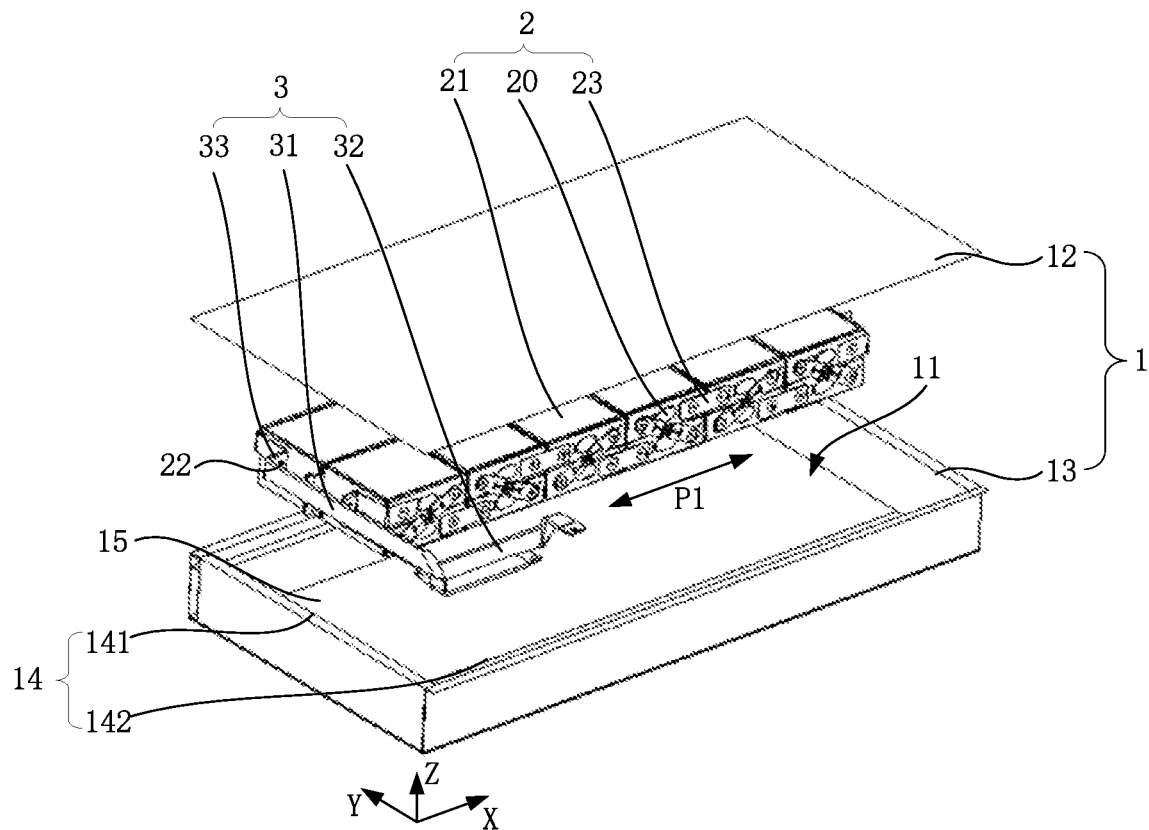
FIG. 3 is an exploded view of a box body of the battery pack in an opened state according to some embodiments of the present disclosure.

To describe the technical scheme of each embodiment of the present disclosure more clearly, a coordinate system is established in FIG. 3, and subsequent description about directions of a battery pack is made based on the coordinate system. Referring to FIG. 3, a battery cell 21 forms two layers of 6*2 battery arrays, wherein an axis x is a length direction of a battery module 2, i.e., an arrangement direction of six battery cells 21. An axis Y is perpendicular to the axis X, and the axis Y represents a width direction of the single battery array, i.e., an arrangement direction of two battery cells 21 in the 6*2 battery arrays. An axis Z is perpendicular to a plane formed by the axis X and the axis Y, and the axis Z represents a height direction of the battery module 2. In description of some embodiments of the present disclosure, terms "upper" and "lower" are relative to the direction of the axis Z. The length direction of the box body 1 is consistent with the length direction of the battery pack, the width direction of the box body 1 is consistent with the width direction of the battery pack, and the height direction of the box body 1 is consistent with the height direction of the battery pack.

In the description of some embodiments of the present disclosure, it is to be understood that the orientations or positions represented by the terms of "top", "bottom", "inside", "outside", and the like are based on the accompanying drawings, they are merely for ease of a description of the present disclosure and a simplified description instead of being intended to indicate or imply the apparatus or element to have a special orientation or to be configured and operated in a special orientation. Thus, they cannot be understood as limiting of the present disclosure.

Figure 2:
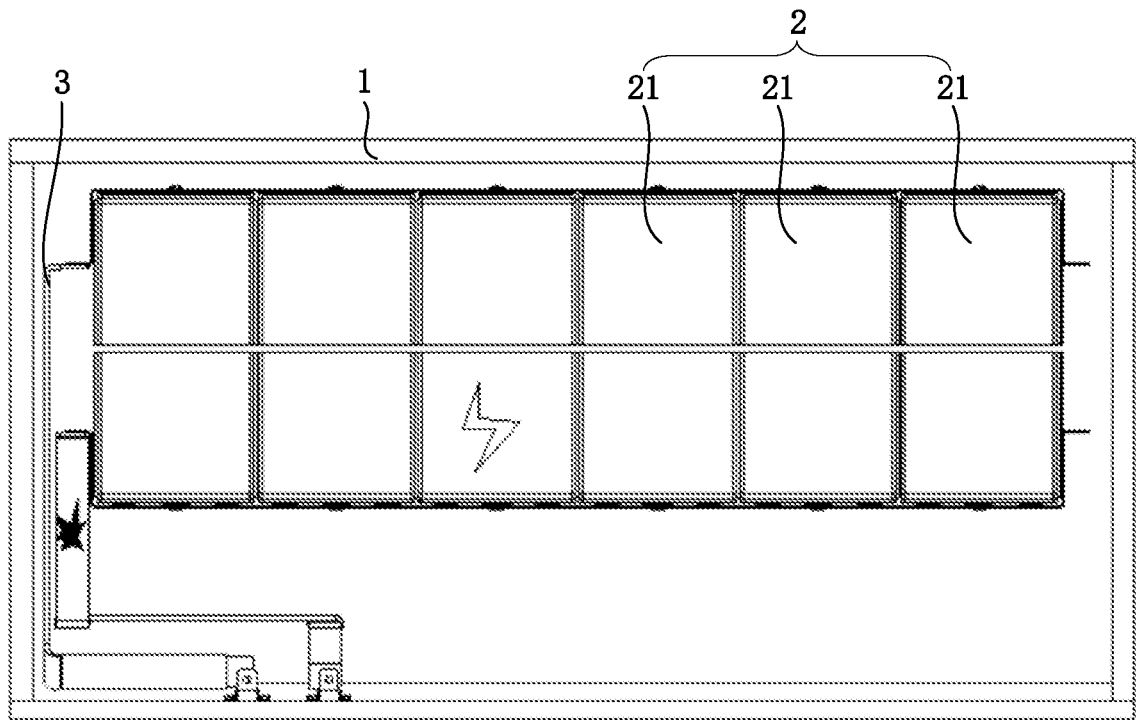
FIG. 2 is a schematic diagram of secondary short circuit of the battery pack.
Figure 4A:
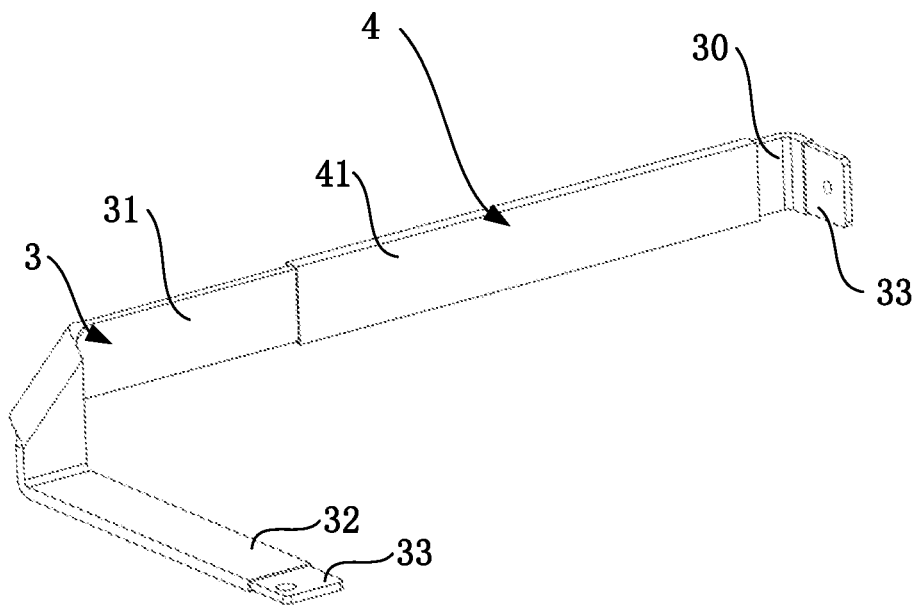
FIG. 4a is a schematic three-dimensional structural diagram of a module electrical connection piece of the battery pack according to some embodiments of the present disclosure.
Figure 10:
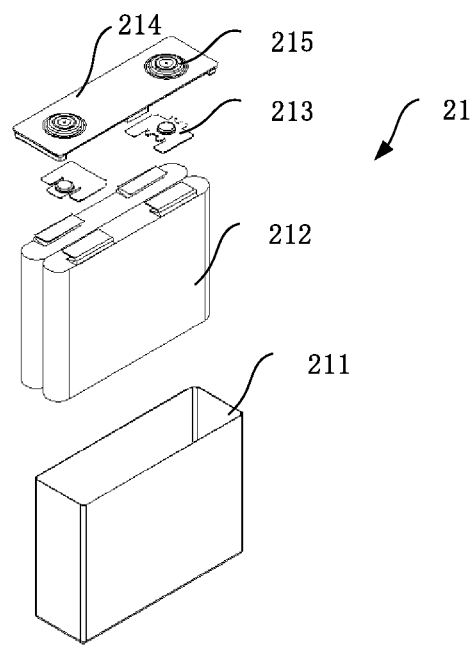
FIG. 10 is a schematic diagram showing a breakdown structure of a battery cell of the battery pack according to the embodiments of the present disclosure.

Referring to FIG. 2, the battery module 2 includes one or more battery cell sequences. The battery cell sequence includes at least one battery cell 21. Each of the battery cells 21 includes an outer shell 211 (a position of the outer shell 211 is seen in FIG. 10) and an anti-explosion assembly 20 mounted on the outer shell 211 (a position of the anti-explosion assembly 20 is seen in FIG. 3). It is found by inventors that when thermorunaway takes place on a certain single battery cell 21 in the battery module 2, a high-temperature and high-pressure ejecta air flow ejected by the anti-explosion assembly 20 of the battery cell 21 will impact a module electrical connection piece 3, such that an insulating sleeve 30 on a surface of the module electrical connection piece 3 (a position of the insulating sleeve 30 is seen in FIG. 4a) cracks and fails, and the module electrical connection piece 3 loses insulation and heat insulation protection. Under the high-temperature air flow, the module electrical connection piece 3 losing protection will be fused. In this case, if any position of the module electrical connection piece 3 is in conducting contact with a box body 1, all battery cells 21 between this position and the runaway battery cell 21 is short-circuited, resulting in short-circuited failure of a plurality of battery cells 21. The battery module 2 will emit a lot of heat, which causes a severe safety risk. Therefore, it is necessary to protect the module electrical connection piece 3 of the battery module 2 in a thermorunaway state. By adopting the technical scheme provided by the embodiments of the present disclosure, occurrence of a short circuit in a major loop is effectively reduced or even avoided when thermorunaway takes place on the single battery cell 21.

Figure 1:
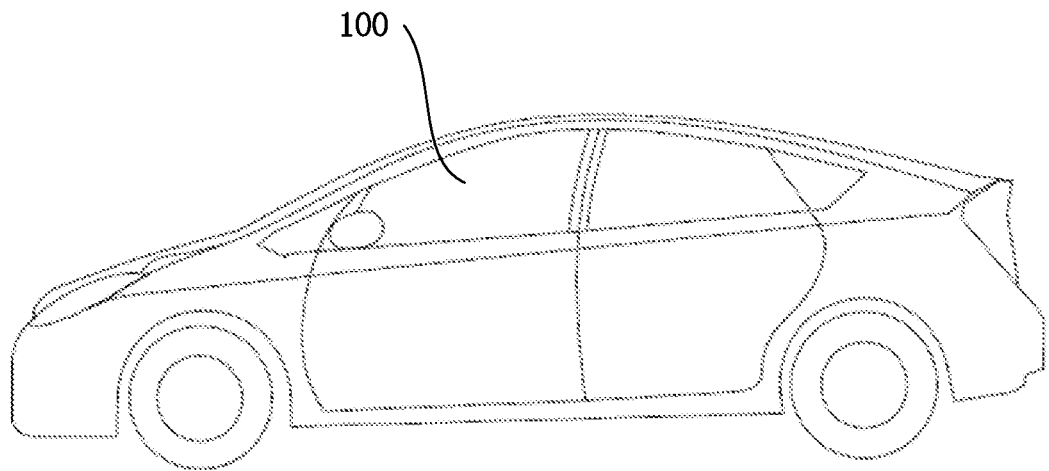
FIG. 1 is a schematic structural diagram of an automobile using a battery pack as a power supply according to some embodiments of the present disclosure.

Referring to FIG. 1, some embodiments of the present disclosure provide an apparatus 100 using a battery pack as a power supply. The apparatus includes the battery pack provided by any one technical scheme of the present disclosure. The apparatus is specifically a traffic apparatus, an energy storage electric cabinet and the like. The traffic apparatus is, for example, an electric automobile, a steamer, an unmanned aerial vehicle and the like. The battery pack is arranged at a bottom of a vehicle body, and adopts a rechargeable battery.

Figure 4B:
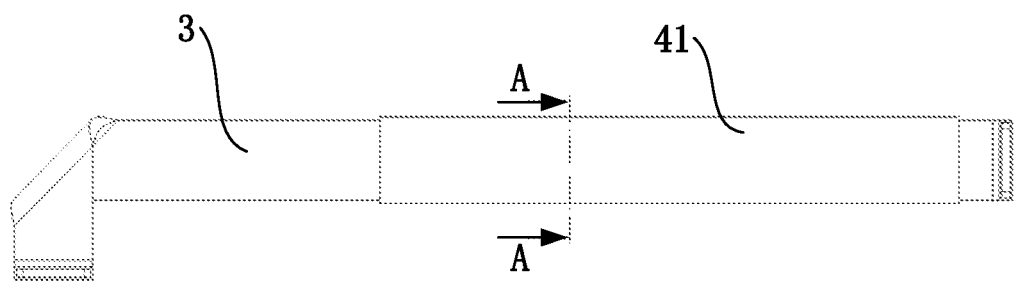
Figure 4C:
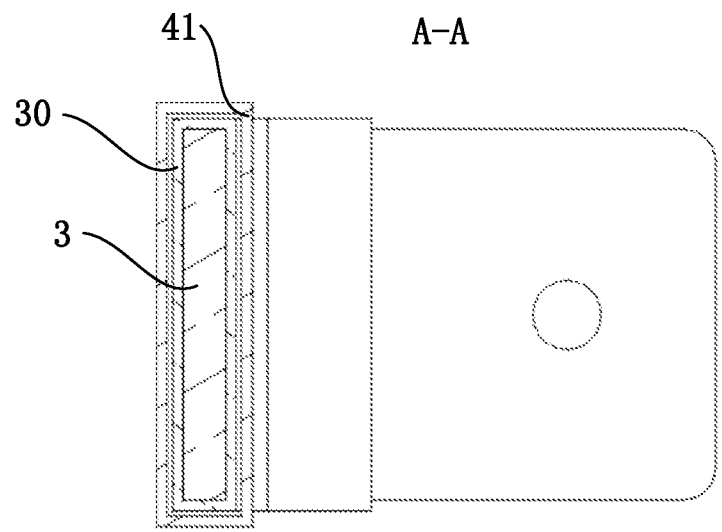
FIG. 4c is an A-A enlarged section view of FIG. 4b.

Referring to FIGS. 3 to 4c, some embodiments of the present disclosure provide a battery pack, which includes a box body 1, a battery module 2, a module electrical connection piece 3, and a first protecting assembly 4.

Referring to FIG. 3, in some embodiments, the box body 1 includes a box cap 12 and a lower box body 13. The box body 1 is of a similarly rectangular structure, and there are four inner side walls of the box body 1: two first side walls 141 arranged oppositely along a Y direction and two second side walls 142 arranged oppositely along an X direction. The first side walls 141 and the second side walls 142 are fixedly connected.

The lower box body 13 and the box cap 12 enclose an accommodation cavity 11, and the battery module 2 is mounted in the accommodation cavity 11 of the box body 1. The box body 1 and the battery module 2 are detachably connected or are fixed by glue. By adopting the above implementation mode, connection between the battery module 2 and the box body 1 is stable and reliable, which improves safety and reliability of the battery pack.

The battery module 2 includes one or more battery cell sequences. An electric connecting mode among the battery cell sequences is arranged as serial connection, parallel connection or parallel-series connection as needed, to implement electric performance needed by the battery pack. With continued reference to FIG. 3, two rows of battery cell sequences 21 are arranged in the box body along a width direction (i.e., the direction of the axis Y) of the battery pack. In an actual application, three or more rows of battery cells sequences are provided. As needed, in the actual use, one or more layers of battery cell sequences are further arranged in the height direction of the battery pack, i.e., the direction of the axis Z in FIG. 3.

The module electrical connection piece 3 is mounted in the box body 1, and the module electrical connection piece 3 is configured to output electric energy of the battery module 2 outside the box body 1 of the battery pack. Specifically, one end of the module electrical connection piece 3 is electrically connected with the electrical connection piece 22 at an output end of the battery module 2, and the other end of the module electrical connection piece 3 is electrically connected with an electric appliance positioned outside the box body 1 of the battery pack. The electric appliance positioned outside the box body 1 is also referred to as an external electric appliance. The external electric appliance is, for example, a controller, a motor, an electric control box and the like.

Referring to FIG. 3 to FIG. 4b, the module electrical connection piece 3 is bended and includes a first connection piece 31 and a second connection piece 32 connected integrally. End portions of the first connection piece 31 and the second connection piece 32 are both provided with connecting ends 33. One of the connecting ends 33 is configured to electrically connect the electrical connection piece 22 at the output end of the battery module 2, and the other connecting end 33 is configured to electrically connect the external electric appliance.

The first protecting assembly 4 is configured to protect the module electrical connection piece 3 when an ejecta discharged from the anti-explosion assembly 20 impacts the module electrical connection piece 3. It is a phenomenon of reducing electric connection between the module electrical connection piece 3 under the circumstance of being melted and deformed due to impact of the high-temperature and high-pressure ejecta and the box body 1. It means that the first protection assembly 4 is configured to insulate and isolate the box body 1 from the module electrical connection piece 3 under the high-temperature and high-pressure condition. The ejecta refers to the high-temperature and high-pressure air flow or even an air flow and an electrolyte with sparks and flames generated in the battery during thermal failure of the battery cell 21, and is ejected when the anti-explosion valve is opened.

In some embodiments, a material of the first protecting assembly 4 is mica. The first protecting assembly 4 adopts mica powder, a relatively thin mica plate or other structures. The first protecting assembly 4 includes a plurality of scattered blocks, a plurality of spliced blocks or an integral block. Mica resists high temperature and protect thermal impact well. The material of the first protecting assembly 4 is suitable for various implementation modes of the first protecting assembly 4 introduced below.

Referring to FIG. 4a to FIG. 4c, in some embodiments, the first protecting assembly 4 includes a shell 41, and the module electrical connection piece 3 is positioned in the shell 41. Here, most region of the module electrical connection piece 3 is positioned in the shell 41 to play a protecting role. The shell 41 has various structural forms, for example, a single plate which is only arranged on a surface of the module electrical connection piece 3 subjected to the strongest impact, or is of an "L"-shaped or "U"-shaped protecting structure formed by combining a plurality blocks. The outer side of the surface of the module electrical connection piece 3 aligned with the ejecta is provided with the shell 41 to protect the module electrical connection piece 3.

The shell 41 certainly as much as possible wraps the surface of the module electrical connection piece 3 to realize comprehensive protection. The material of the shell 41 is, for example, mica or other materials with similar performance. In different regions of the module electrical connection piece 3, the shell 41 is different in thickness. For example, in the region with strong impact, the shell 41 is large in thickness. For example, in the region with not strong impact, the shell 41 is small in thickness. The structure realizes more targeted protection and reduce the material of the shell 41 needed, and thus manufacturing costs are lowered. It is to be noted that an insulating sleeve 30 made from a polyolefin material is originally arranged outside the module electrical connection piece 3. When the shell 41 is arranged, the insulating sleeve 30 outside the module electrical connection piece 3 is either reserved or removed. In the case as shown in FIG. 4a to FIG. 4c, the insulating sleeve 30 outside the module electrical connection piece 3 is reserved, and the shell 41 directly wraps outside of the insulating sleeve 30.

A protecting process of the battery pack provided by the embodiments of the present disclosure is introduced below: the anti-explosion assemblies 20 of the plurality of battery cells 21 and the module electrical connection piece 3 are positioned in the box body. Once thermorunaway takes place on a certain battery cell 21, the ejecta air flow generated in the battery cell 21 is discharged via the anti-explosion assembly 20 in the battery cell 21, and the high-temperature and high-pressure ejecta air flow will impact the module electrical connection piece 3. According to the technical scheme, the first protecting assembly 4 is arranged, and the first protecting assembly 4 protects the module electrical connection piece 3 to reduce or even prevent melting and deforming failure of the module electrical connection piece 3 caused by the ejecta air flow. It is to be noted that the material of the module electrical connection piece 3 typically is aluminum, whose melting point is 660° C. When the ejecta air flow is strong, the temperature of the ejecta air flow far exceeds the melting point of aluminum, so that the module electrical connection piece 3 is melted to splash.

Figure 5A:
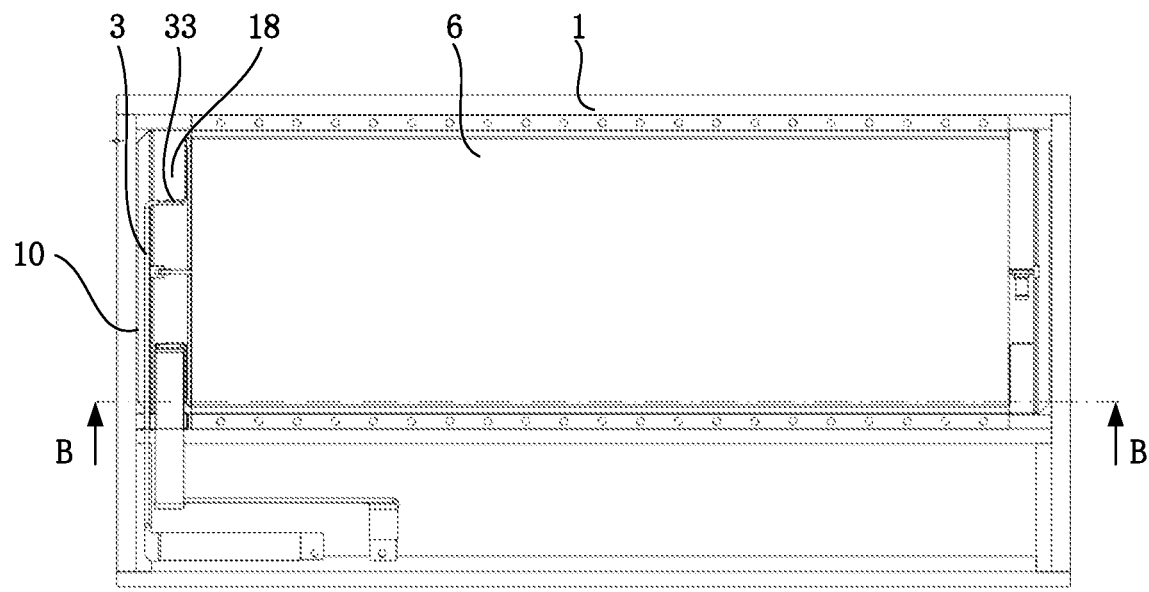
FIG. 5a is a schematic top view of the battery pack with its box cap removed according to some embodiments of the present disclosure.
Figure 5B:
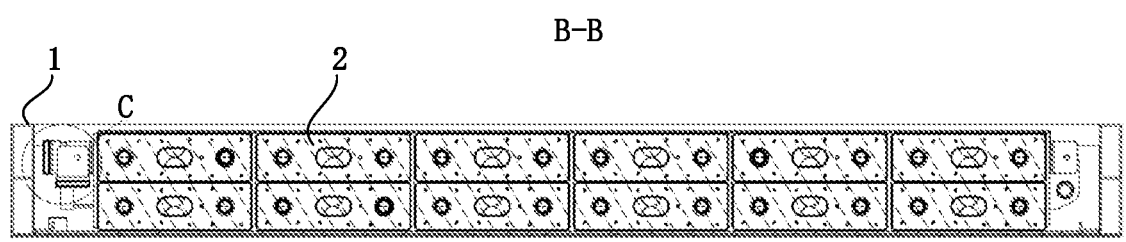
Figure 5C:
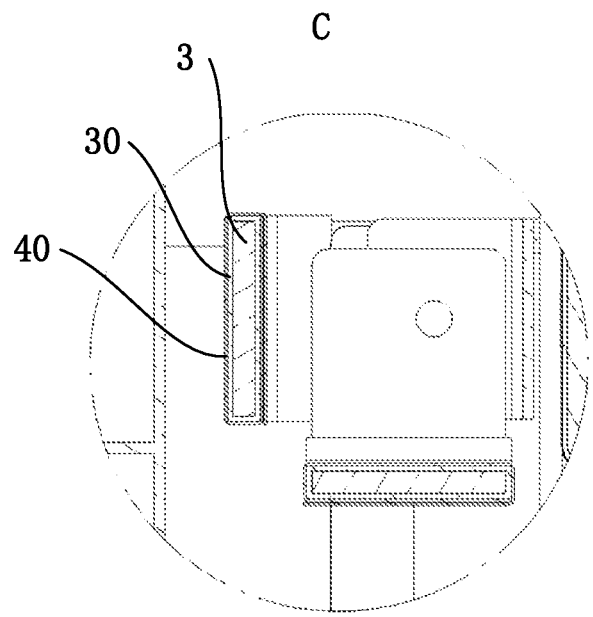
FIG. 5c is a partially enlarged schematic view of Area C in FIG. 5b.

Referring to FIG. 5a to FIG. 5c, in some other embodiments, the first protecting assembly 4 includes protection sheet 40 wrapping the module electrical connection piece 3. The protection sheet 40 wraps the module electrical connection piece 3 integrally, and a part of regions of the protection sheet 40 are overlapped with each other. The overlapping portion of the protection sheet 40 is pasted together by glue. It is to be noted that when the protection sheet 40 is provided, the insulating sleeve 30 outside the module electrical connection piece 3 is either reserved or removed. In the case as shown in FIG. 5a to FIG. 5c, the insulating sleeve 30 outside the module electrical connection piece 3 is reserved, and the protection sheet 40 directly wraps outside of the insulating sleeve 30. The protection sheet 40 has a better protecting effect, when the high-temperature and high-pressure ejecta impacts the protection sheet, the ejecta impacts a surface of the protection sheet 40. As long as the protection sheet 40 is free of a cracking phenomenon, the insulating sleeve 30 positioned in the protection sheet 40 is always prevented from cracking and falling due to impact by the high-temperature and high-pressure ejecta, such that the module electrical connection piece 3 is better protected, and a condition that the whole battery module is prone to short circuit due to thermorunaway of the battery cell 21 is prevented.

In other embodiments, the protection sheet 40 wraps an impacted key region of the module electrical connection piece 3, and the key region is tested according to a test. Alternatively, the protection sheet 40 wraps, as much as possible, the surface of the module electrical connection piece 3. The material of the protection sheet 40 is, for example, mica paper or other materials capable of resisting high-temperature impact. The number of the wrapping layers of the protection sheet 40 are one and more. Different wrapping thicknesses is provided in different regions. For example, in the regions with strong impact, the wrapping protection sheet 40 is more in number of layers and the finally formed wrap is large in thickness; or thicker protection sheet 40 is adopted directly. For example, in the regions with not strong impact, the wrapping protection sheet 40 is few in number of layers and the finally formed wrap is small in thickness; or thinner protection sheet 40 is adopted directly.

Figure 6A:
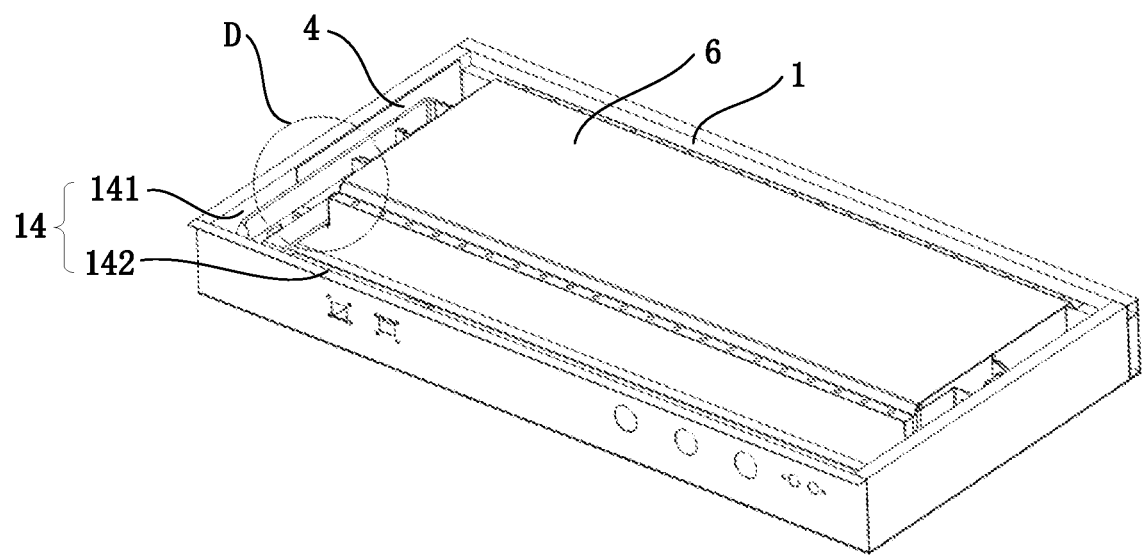
FIG. 6a is another schematic three-dimensional diagram of the battery pack with its box cap removed according to some embodiments of the present disclosure.
Figure 6B:
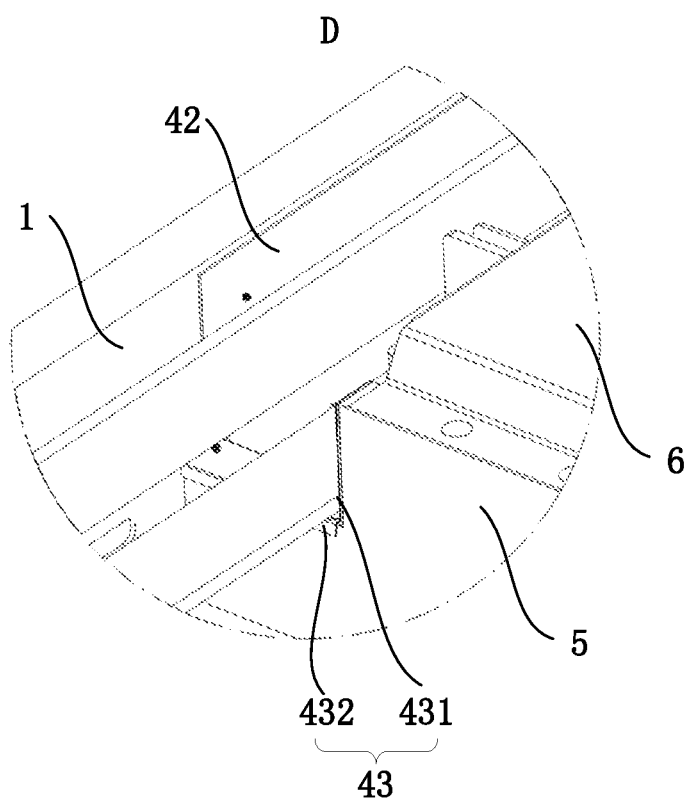

In some other embodiments, referring to FIG. 6*a* and FIG. 6*b*, the first protecting assembly 4 includes a first insulating member 42, the first insulating member 42 is mounted in a side wall 14 or a bottom wall 15 of the box body 1 corresponding to the position of the module electrical connection piece 3, and an annotating position of the bottom wall 15 is referred to FIG. 3. The first insulating member 42 is configured to block at least a part of the side walls 14 of the box body 1, to isolate the box body 1 from the module electrical connection piece 3. The first insulating member 42 blocks the box body 1 to play a protecting role.

Referring to FIG. 6*a* and FIG. 6*b*, the side walls 14 of the box body 1 corresponding to the position of the module electrical connection piece 3 refer to the first side wall 141 and the second side wall 142 corresponding to the module electrical connection piece in the box body 1. The so called bottom wall 15 of the box body 1 corresponding to the position of the module electrical connection piece 3 refers to the bottom wall 15 under the position of the modular electric connections piece 3 of the box body 1. The module electrical connection piece 3 is fused by the high-temperature and high-pressure ejecta air flow discharged from the anti-explosion assembly 20, such that a short circuit is caused by an electrical connection between the module electrical connection piece 3 and the side wall 14 and the bottom wall 15 of the box body 1. For this reason, the first insulating member 42 is arranged on the above position. According to the above technical scheme, at least one of the side wall 14 and the bottom wall 15 of the box body 1 corresponding to the position of the module electrical connection piece 3 is provided with the first insulating member 42. The first insulating member 42 insulates and isolates the box body 1 from the module electrical connection piece 3, to reduce or even prevent a short circuit of the whole battery module due to thermorunaway of the battery cell 21.

The first insulating member 42 is, for example, a mica plate or a material with similar performance. A plurality of first insulating members 42 is arranged, and some of the first insulating members 42 are fixed to the side wall 14 of the box body 1, and some other first insulating members 42 are fixed to the bottom wall 15 of the box body 1. A connecting mode of the first insulating members 42 and the box body 1 is a pasting or similar mode.

It is to be noted that the first protecting assembly simultaneously employs two or three of the shell 41, the protection sheet 40, and the first insulating member 42 to realize multiple protection to prevent the short circuit which occurs when some protection fails.

Referring to FIG. 7 to FIG. 9*c*, in some other embodiments, the battery pack further includes a second protecting assembly 10, the second protecting assembly 10 is mounted in the box body 1 and faces toward the anti-explosion assembly 20, and the second protecting assembly 10 is configured to protect the box body 1 from an impact by the ejecta discharged from the anti-explosion assembly 20.

Figure 7:
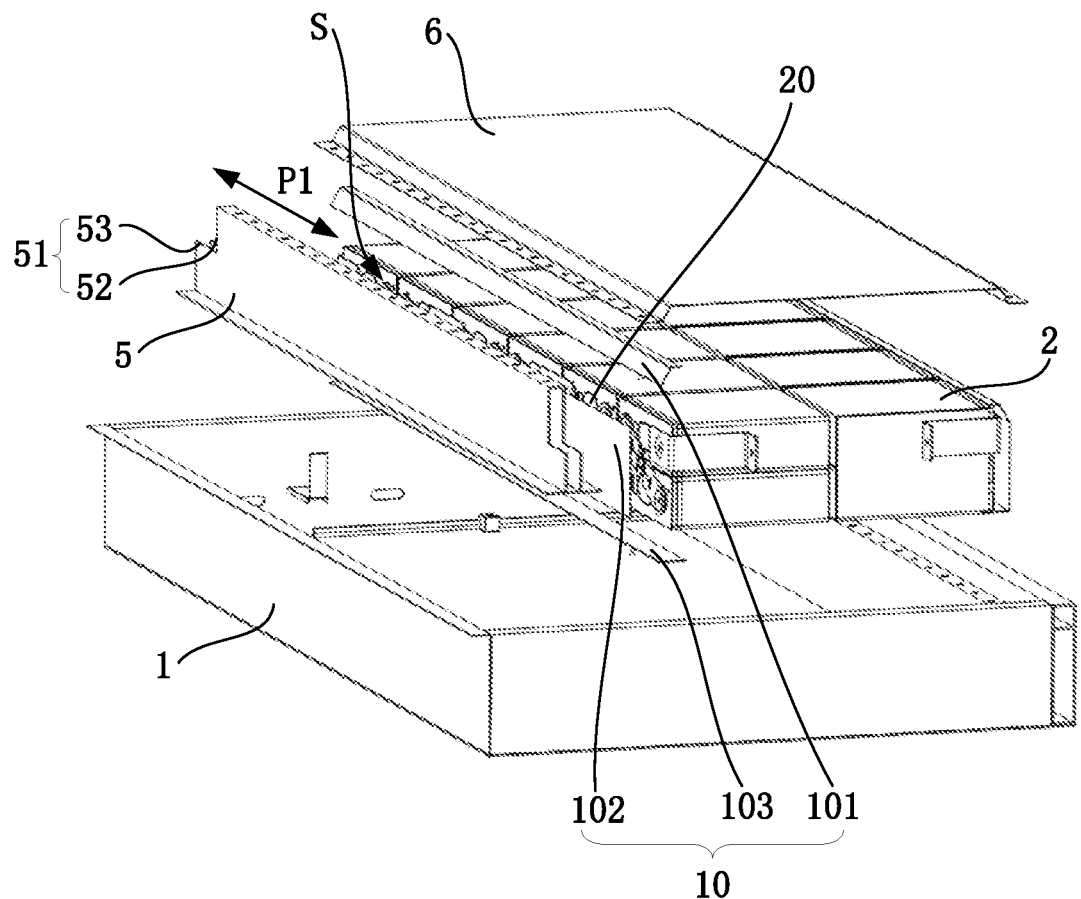
FIG. 7 is an exploded view of a battery pack according to some other embodiments of the present disclosure.
Figure 9A:
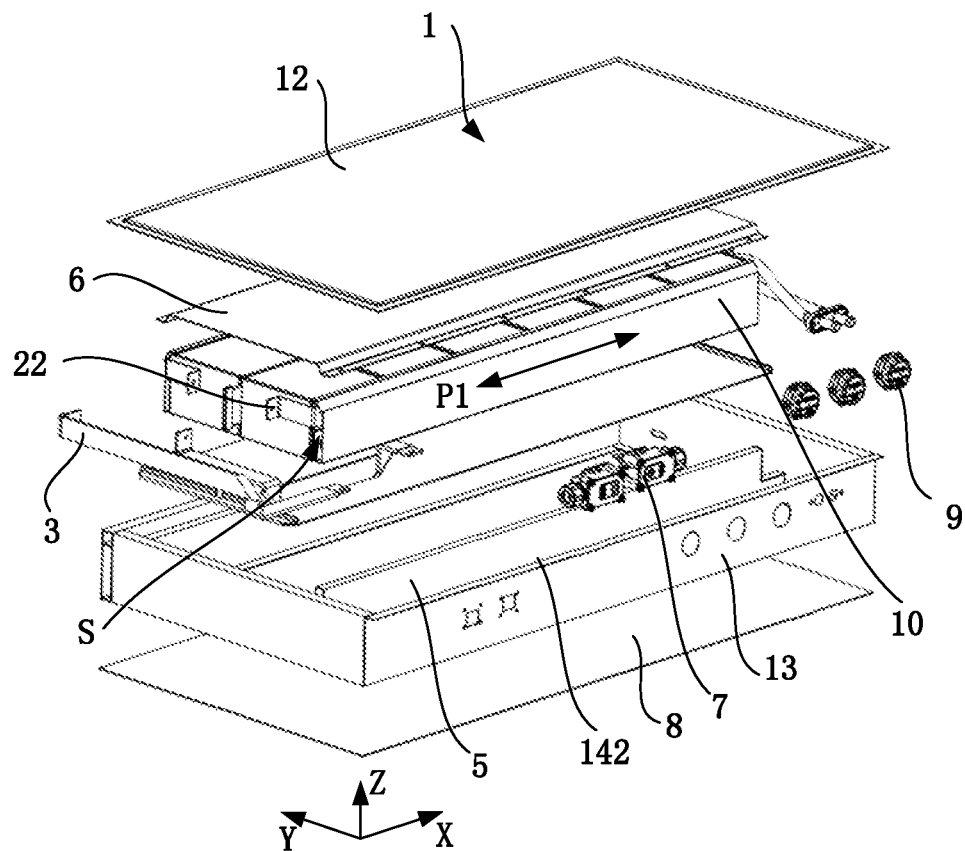
FIG. 9a is a schematic diagram showing a breakdown structure of a battery pack according to yet some other embodiments of the present disclosure.
Figure 9B:
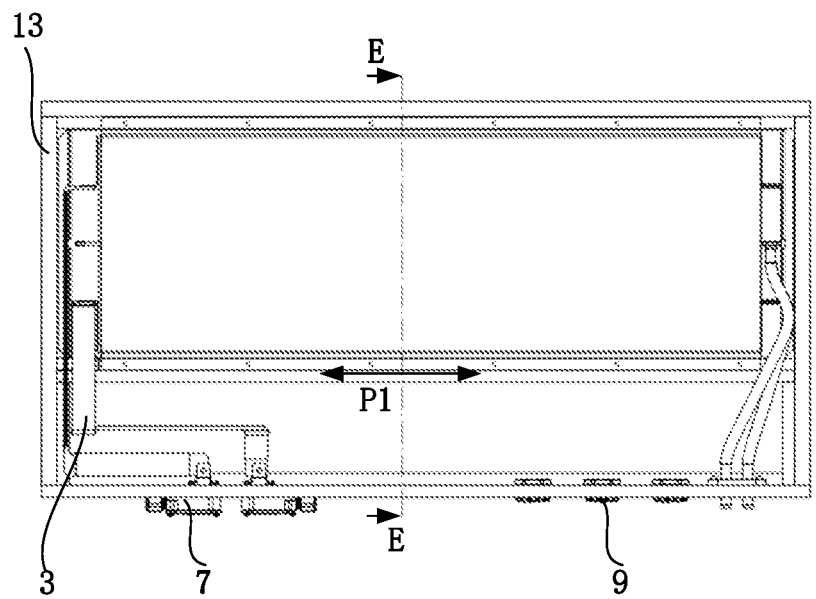
FIG. 9b is a schematic top view of a battery pack with its box cap removed according to some embodiments of the present disclosure.
Figure 9C:
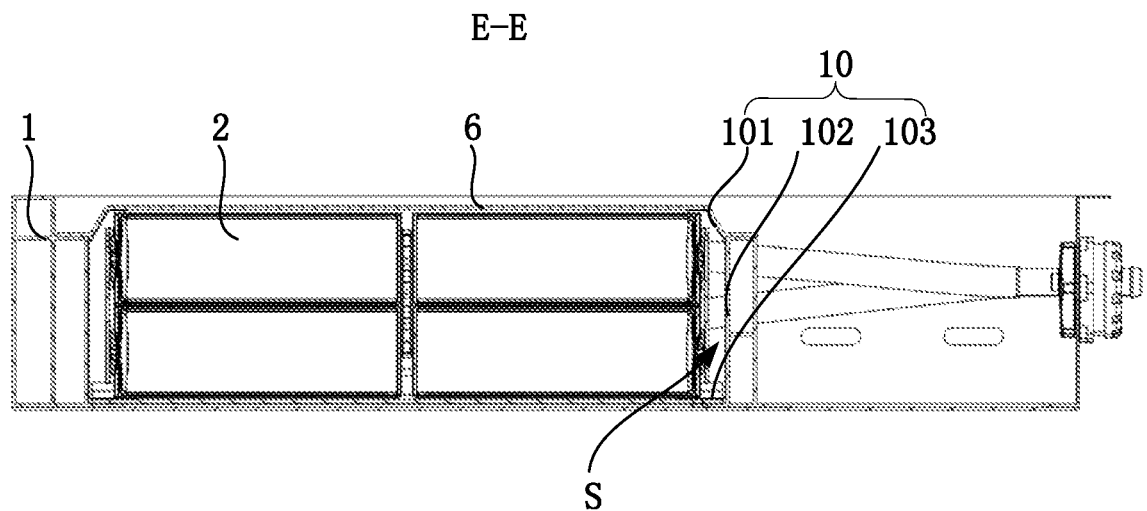
FIG. 9c is a schematic E-E section view of FIG. 9b.

Referring to FIG. 7 or FIG. 9*c*, after the second protecting assembly 10 is arranged, an exhaust channel S is formed among the second protecting assembly 10, the battery module 2, and the first side wall 141 of the box body 1. FIG. 9*c* shows the position of the exhaust channel S. A flowing direction of an air flow in the exhaust channel S is as shown in an arrowhead P1, referring to FIG. 7 or FIG. 9*a*. The second protecting assembly 10 is aligned with the anti-explosion assembly 20 of each of the battery cells 21. The high-temperature and high-pressure ejecta ejected from the anti-explosion assembly 20 of the battery cell 21 directly impacts the second protecting assembly 10 after being ejected, such that the ejecta is prevented from directly impacting the box body 1, and thus the box body 1 is prevented from being damaged. In addition, the second protecting assembly 10 guides the ejecta ejected from the anti-explosion assembly 20, such that most ejecta air flows are discharged along the exhaust channel S formed by the second protecting assembly 10 and the battery module 2. Therefore, exhaust efficiency is improved. On the other hand, due to the presence of the second protecting assembly 10, the ejecta air flow ejected from the anti-explosion assembly 20 is gathered, and the gathered air flow has stronger impact on the module electrical connection pieces 3 positioned on two sides of the exhaust channel S. At this moment, it is more important to provide protection on the module electrical connection pieces 3. When only the insulating sleeve 30 is provide in a scheme adopting the related art, annotation of the insulating sleeve 30 is referred to FIG. 4*a*. The insulating sleeve 30 is prone to cracking and falling under impact, which easily short-circuits the entire battery module. Arrangement of the first protecting assembly 4 introduced above effectively reduces or even prevents a secondary short circuit of the battery module. To guarantee a good protecting effect, the first protecting assembly 4 needs to use a material that resists an instantaneous high temperature of over 1,000° C. and a continuous high temperature of 800° C., for example, mica or other materials with such performance.

The second protecting assembly 10 adopts various structural forms, for example, split or integral form. The two cases will be described in detail below. Referring to FIG. 7, in some embodiments, the second protecting assembly 10 bends toward the anti-explosion assembly 20 along edges of two sides in a direction of a connecting line between the anti-explosion assembly 20 and the module electrical connection piece 3, to enclose the anti-explosion assembly 20 in a space formed by the second protecting assembly 10 and the battery module 2. The space is the exhaust channel S, and an annotation of the exhaust channel S is referred to FIG. 9*c*. In this way, probability that the ejecta from the anti-explosion assembly 20 burns batteries around the battery cell 21 subjected to thermal failure is reduced or even prevented. In addition, it is also reduced probability that a short circuit is caused by contact between a busbar 23 of the battery cell 21 melted and spurted under the action of the ejecta and the box body 1.

Referring to FIG. 7, FIG. 8, FIG. 9*a* or FIG. 9*c*, upper and lower edges of the second protecting assembly 10 are bended after being mounted in position and are bended towards a side of the anti-explosion assembly 20. The second protecting assembly 10 is substantially C-shaped, such that a section of the exhaust channel S corresponding to the second protecting assembly 10 is substantially closed at top and bottom ends. At the moment, the ejecta ejected from the anti-explosion assembly 20 of the thermorunaway battery cell 21 is only discharged from two ends of the exhaust channel S along the length direction. That is, the second protecting assembly 10 further limits the flowing direction of the air flow while playing a comprehensive protecting role, such that a strength of the air flow becomes stronger, and the ejecta has stronger impact on the module electrical connection pieces 3 positioned on two sides of the exhaust channel S. If the first protecting assembly 4 introduced above is not arranged, in this case, it is easier for the module electrical connection pieces 3 to fail and deform under the impact of the ejecta. After the first protecting assembly 4 introduced above is arranged, the probability that the module electrical connection pieces 3 fail and deform under impact of the ejecta is reduced or even prevented effectively under a premise that the second protecting assembly 10 is arranged, such that occurrence of the short circuit is further avoided.

To achieve a good protecting effect, a thickness of the second protecting assembly 10 is set within a range of 0.5-3 mm, and a lap width between the second protecting assembly 10 and a part connected with the second protecting assembly 10 is 3-10 mm. Based on such a design, a hot air flow/flame ejected by thermorunaway is prevented from roasting a side surface of the battery cell 21 with the largest area. Meanwhile, the second protecting assembly 10 and the part (for example, a beam 5 introduced below) connected with the second protecting assembly 10 are riveted by means of a plastic rivet. In this way, in one aspect, a short circuit between the battery cell 21 and the box body caused due to using a metal connecting piece is avoided. In another aspect, it is guaranteed a good connection between the second protecting assembly 10 and the box body, such that it is avoidable that position offset of the second protecting assembly 10 is caused by the ejecta discharged from an anti-explosion valve after thermorunaway of the battery, and thus a negative effect on the protecting role of the second protecting assembly 10 is avoided.

In some embodiments, to guarantee a good protecting effect of the second protecting assembly, the second protecting assembly 10 adopts a mica plate and materials with similar performance. Referring to FIG. 6a, FIG. 6b, FIG. 7 and FIG. 9a together, in these embodiments, the battery pack further includes a beam 5. A surface of the battery cell 21 provided with the anti-explosion assembly 20 is parallel to the beam 5, and the second protecting assembly 10 introduced above is arranged between the surface of the battery cell 21 provided with the anti-explosion assembly 20 and the beam 5. After the beam 5 is arranged, the second insulating portion 102 of the second protecting assembly 10 is attached and fixed to the maximum side surface of the beam 5, thereby simplifying the fixing difficulty of the second protecting assembly 10. The beam 5 is provided with a notch 51, and the module electrical connection piece 3 penetrates through the notch 51 and is configured to electrically connect an external electric appliance. The first protecting assembly 4 further includes a second insulating member 43 mounted on the notch 51, and the second insulating member 43 is configured to isolate the module electrical connection piece 3 from the beam 5.

Referring to FIG. 6b and FIG. 7, the notch 51 of the beam 5 is further provided with the second insulating member 43, and the second insulating member 43 insulates and isolates the beam 5 form the module electrical connection piece 3. The second insulating member 43 includes, for example, a first mica plate 431 and a second mica plate 432. The notch 51 is substantially L-shaped, and the notch 51 includes a side surface 52 and a bottom surface 53. The module electrical connection piece 3 is placed on the bottom surface 53 of the notch 51 or has a certain gap with the bottom surface 53 of the notch 51. The first mica plate 431 is fixed to the side surface 52 of the notch 51, and the second mica plate 432 is fixed to the bottom surface 53 of the notch 51. A fixing mode of the first mica plate 431 and the second mica plate 432 is pasting.

Referring to FIG. 7a and FIG. 9a, in these embodiments, the battery pack further includes a pressing plate 6 configured to fix the battery module 2. The pressing plate 6 is mounted and fixed to the beam 5. Besides a role of mounting the pressing plate 6, the beam 5 further segments an inner space of the box body 1, so that battery modules in other spaces are prevented from being affected after thermorunaway of the battery module in some space to cause severe accidents.

Referring to FIG. 7, in some embodiments, the second protecting assembly 10 is fixedly connected with at least one of the pressing plate 6, the beam 5 and the box body 1. The second protecting assembly 10 includes a first insulating portion 101, a second insulating portion 102 and a third insulating portion 103. In an embodiment, the three portions are independent and are not connected one another. Specifically, the first insulating portion 101 is fixedly connected with the pressing plate 6 and the second insulating portion 102 are fixedly connected with the beam 5. The third insulating portion 103 is fixedly connected with the bottom wall of the box body 1. The first insulating portion 101, the second insulating portion 102 and the third insulating portion 103 is fixed to the box body 1 by other ways of gluing, bolt locking or slot designing and the like. The second protecting assembly 10 is in the split structural design and is connected with the box body 1, so that it is easier to mount and position the second protecting assembly 10 while saving the mounting space. The first insulating portion 101, the second insulating portion 102 and the third insulating portion 103 are of strip-type structures, so that the second protecting assembly 10 is matched with peripheral parts well.

Figure 8:
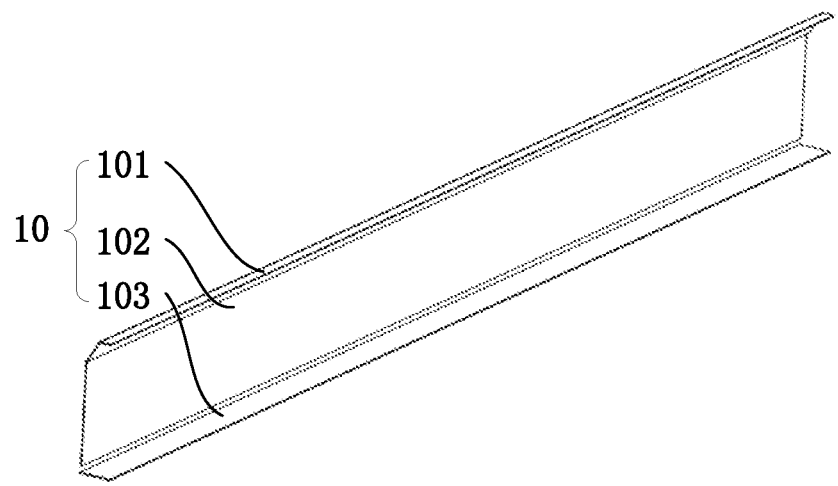
FIG. 8 is a schematic three-dimensional structural diagram of a second protecting assembly of a battery pack according to yet some other embodiments of the present disclosure.

Certainly, referring to FIG. 8, in some other embodiments, the second protecting assembly 10 is of an integral structure. The first insulating portion 101, the second insulating portion 102 and the third insulating portion 103 are integral, and the second protecting assembly is further mounted by connecting any one of the three with the pressing plate 6, the beam 5 or the box body 1.

Referring to FIG. 9a to FIG. 9c, in some other embodiments, in order to facilitate connection between the battery module and the external circuit, the second side wall 142 of the box body 1 is provided with a high voltage connector 7, and the position of the high voltage connector 7 is seen in FIG. 9a. The module electrical connection piece 3 is electrically connected with the external electric appliance via the high voltage connector 7 mounted on the box wall. With continued reference to FIG. 9a, in some other embodiments, the second side wall 142 of the box body 1 is provided with the anti-explosion valve 9 of the battery pack.

Figure 11:
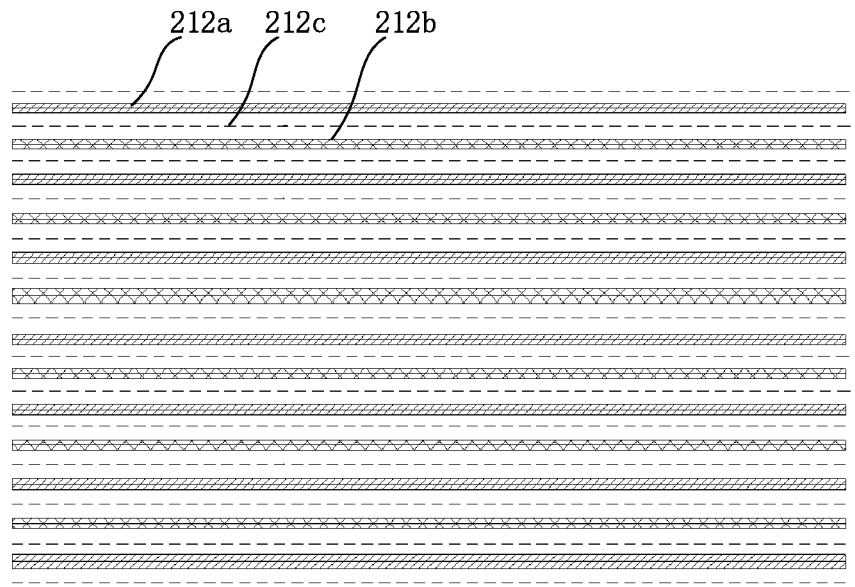
FIG. 11 is a schematic structural diagram of a stacked electrode assembly.
Figure 12:
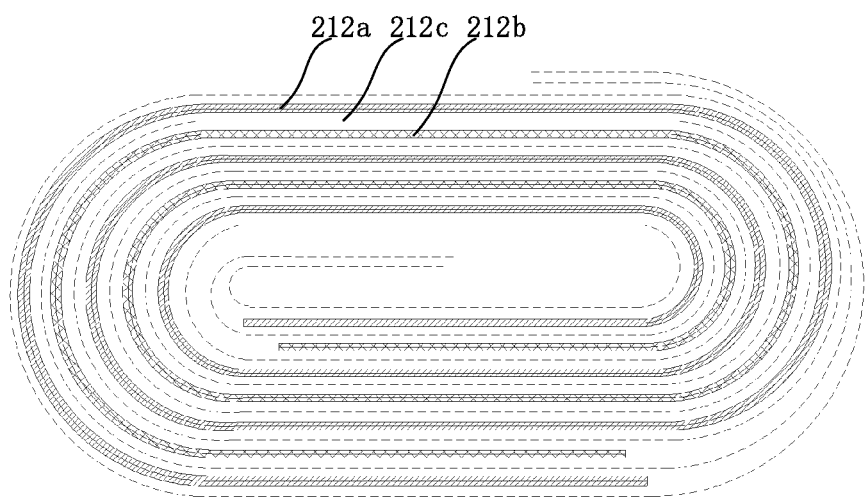
FIG. 12 is a schematic structural diagram of a wound electrode assembly.

Referring to FIG. 10 to FIG. 12, a structure that is adopted by the battery cell 21 is introduced in the embodiments below.

Referring to FIG. 10, the battery cell 21 includes an outer shell 211, an electrode assembly 212 arranged in the outer shell 211, a connecting piece 213 arranged on the end portion of the electrode assembly 212 and a cover plate 214 connected with the outer shell 211. The cover plate 214 is provided with an electrode terminal 215 and an anti-explosion assembly 20.

Manufacturing modes of the electrode assembly 212 include a stacked type and a wound type. As shown in FIG. 11, the stacked electrode assembly is the electrode assembly 212 formed by cutting an anode plate 212a, a cathode plate 212b and a diaphragm 212c into specified dimensions and then stacking the anode plate 212a, the diaphragm 212c, and the cathode plate 212b. As shown in FIG. 12, the wound electrode assembly is formed by winding the anode plate 212a, the cathode plate 212b, and the diaphragm 212c. Surfaces of the stacked electrode assembly and the wound electrode assembly with the largest areas are surfaces with maximum expansion deformation.

In the description of the present disclosure, it is to be understood that the orientations or positions represented by the terms of "center", "longitudinal", "transverse", "front", "back", "left", "right", "vertical", "horizontal", "top", "bottom", "inside", "outside", and the like are based on the accompanying figures, they are merely for ease of a description of the present disclosure and a simplified description instead of being intended to indicate or imply the apparatus or element to have a special orientation or to be configured and operated in a special orientation. Thus, they cannot be understood as limiting of the present disclosure.

Finally, it should be noted that the foregoing embodiments are merely intended for describing the technical scheme of the present disclosure, but not for limiting the present disclosure. Although the present disclosure is described in detail with reference to the preferred embodiments, persons of ordinary skill in the art should understand that they still make modifications to the specific embodiments of the present disclosure or make equivalent replacements to some technical features without departing from the spirit of the technical scheme of the present disclosure, which shall fall within the scope of the technical scheme claimed in the present disclosure.

What is claimed is:

1. A battery pack, comprising:
 a box body;
 a battery module mounted in the box body, the battery module comprising more than one battery cell, each battery cell comprising an anti-explosion assembly;
 a module electrical connection piece mounted on the battery module;
 a first protecting assembly mounted in the box body and configured to protect the module electrical connection piece when an ejecta discharged from the anti-explosion assembly impacts the module electrical connection piece; and
 a second protecting assembly mounted in the box body and facing toward the anti-explosion assembly, the second protecting assembly being configured to protect the box body from an impact by the ejecta discharged from the anti-explosion assembly.

2. The battery pack according to claim 1, wherein the first protecting assembly comprises protection sheet wrapped around the module electrical connection piece.

3. The battery pack according to claim 1, wherein the first protecting assembly comprises a shell, and the module electrical connection piece is positioned in the shell.

4. The battery pack according to claim 1, wherein the first protecting assembly comprises:
 a first insulating member mounted on a side wall and/or a bottom wall of the box body corresponding to the module electrical connection piece, the first insulating member being configured to isolate the box body from the module electrical connection piece.

5. The battery pack according to claim 1, wherein the second protecting assembly bends toward the anti-explosion assembly along edges of two sides in a direction of a connecting line between the anti-explosion assembly and the module electrical connection piece, to enclose the anti-explosion assembly in a space formed by the second protecting assembly and the battery module.

6. The battery pack according to claim 5, further comprising:
 a beam provided with a notch, wherein the module electrical connection piece penetrates through the notch and is configured to electrically connect an external electric appliance,
 wherein the first protecting assembly further comprises a second insulating member mounted on the notch, the second insulating member being configured to isolate the module electrical connection piece from the beam.

7. The battery pack according to claim 6, further comprising:
 a pressing plate, fixedly connected with the beam to fix the battery module.

8. The battery pack according to claim 1, wherein a material of the first protecting assembly is mica.

9. An apparatus using a battery pack as a power supply, comprising the battery pack according to claim 1.

* * * * *